(12) United States Patent
Hsieh et al.

(10) Patent No.: US 12,296,503 B2
(45) Date of Patent: May 13, 2025

(54) DOUBLE SCREW CUTTER FOR RECYCLED CARBON FIBER MATERIAL AND METHOD OF CUTTING RECYCLED CARBON FIBER MATERIAL BY USING THE SAME

(71) Applicant: NATIONAL KAOHSIUNG UNIVERSITY OF SCIENCE AND TECHNOLOGY, Kaohsiung (TW)

(72) Inventors: Tsung-Han Hsieh, Kaohsiung (TW); I-Hsin Wang, Kaohsiung (TW); Ting-Yu Chang, Kaohsiung (TW); Bo-Wei Guo, Kaohsiung (TW)

(73) Assignee: National Kaohsiung University of Science and Technology, Kaohsiung (TW)

( * ) Notice: Subject to any disclaimer, the term of this patent is extended or adjusted under 35 U.S.C. 154(b) by 258 days.

(21) Appl. No.: 18/048,811

(22) Filed: Oct. 21, 2022

(65) Prior Publication Data
US 2023/0373132 A1  Nov. 23, 2023

(30) Foreign Application Priority Data
May 20, 2022 (TW) .................................. 111118929

(51) Int. Cl.
*B29B 17/04* (2006.01)
*B29K 307/04* (2006.01)

(52) U.S. Cl.
CPC ...... *B29B 17/04* (2013.01); *B29B 2017/0476* (2013.01); *B29K 2307/04* (2013.01); *B29K 2995/0094* (2013.01)

(58) Field of Classification Search
CPC ....... B29C 48/52; B29C 48/525; B02C 19/22; B29B 17/04
See application file for complete search history.

(56) References Cited

U.S. PATENT DOCUMENTS

| | | | | |
|---|---|---|---|---|
| 2,543,894 A | * | 3/1951 | Colombo .............. | B29C 48/402 425/204 |
| 3,499,186 A | * | 3/1970 | Nagamasa .......... | B29C 44/3442 425/204 |
| 4,247,206 A | * | 1/1981 | Zahradnik ............. | B29C 48/395 366/323 |
| 4,935,183 A | * | 6/1990 | Wenger ................. | B30B 11/243 264/211.21 |
| 4,970,037 A | * | 11/1990 | Kafka ..................... | B29C 48/52 264/211 |

(Continued)

*Primary Examiner* — Andrew D Graham
(74) *Attorney, Agent, or Firm* — Rosenberg, Klein & Lee

(57) ABSTRACT

A double screw cutter for recycled carbon fiber material and a method of cutting recycled carbon fiber material by using the same are provided. The double screw cutter includes a housing and counter-rotating twin screws. A cut channel is formed in the housing while a long-fiber feed inlet, a mid-fiber feed inlet, and a short-fiber feed inlet are disposed on an outer surface of the housing and all communicated with the cut channel. A discharge outlet is arranged at a rear end of the housing and communicated with the cut channel. The counter-rotating twin screws are mounted in the cut channel of the housing and provided with two screw rods rotated in opposite directions simultaneously. Thereby recycled carbon fiber with different lengths is cut into a preset length and thus the following processes and applications of the recycled carbon fiber become more convenient.

7 Claims, 2 Drawing Sheets

(56) References Cited

U.S. PATENT DOCUMENTS

| | | | | |
|---|---|---|---|---|
| 5,281,379 | A * | 1/1994 | Noguchi | B29B 7/007 264/102 |
| 5,374,387 | A * | 12/1994 | Barnes | B29B 7/7495 264/40.6 |
| 6,419,864 | B1 * | 7/2002 | Scheuring | B29C 48/297 264/102 |
| 7,329,037 | B2 * | 2/2008 | Mueller | B29C 48/605 366/89 |
| 10,532,492 | B2 * | 1/2020 | Kobayashi | B29B 7/847 |
| 11,578,271 | B1 * | 2/2023 | Griffin, II | B29B 17/02 |
| 2003/0112698 | A1 * | 6/2003 | Hauck | B30B 9/26 366/85 |
| 2004/0086592 | A1 * | 5/2004 | Winter | B29C 48/395 425/204 |
| 2005/0206029 | A1 * | 9/2005 | Moore | B29C 48/05 264/143 |
| 2006/0261509 | A1 * | 11/2006 | Lustiger | B29C 45/0001 264/211 |
| 2007/0104930 | A1 * | 5/2007 | Grohman | B29C 48/022 428/212 |
| 2007/0148320 | A1 * | 6/2007 | Uchiyama | B29C 48/501 426/512 |
| 2008/0069916 | A1 * | 3/2008 | Regalia | B29B 7/489 425/204 |
| 2008/0093763 | A1 * | 4/2008 | Mancosh | B29C 48/67 264/211 |
| 2008/0128933 | A1 * | 6/2008 | Przybylinski | B29B 7/603 521/40 |
| 2008/0213562 | A1 * | 9/2008 | Przybylinski | B29B 7/92 156/701 |
| 2008/0254158 | A1 * | 10/2008 | Holzel | B29C 48/64 425/204 |
| 2008/0267003 | A1 * | 10/2008 | Kasliwal | B29C 48/022 366/85 |
| 2009/0161476 | A1 * | 6/2009 | Narukawa | B29C 48/395 366/76.3 |
| 2009/0192280 | A1 * | 7/2009 | Otoshi | B29C 48/917 536/63 |
| 2009/0315219 | A1 * | 12/2009 | Shelby | B29C 48/635 264/328.17 |
| 2010/0159213 | A1 * | 6/2010 | Przybylinski | C08L 23/0876 428/537.1 |
| 2010/0176527 | A1 * | 7/2010 | Fischer | B29C 48/387 366/77 |
| 2011/0091596 | A1 * | 4/2011 | Saiuchi | B29B 7/60 425/376.1 |
| 2012/0077890 | A1 * | 3/2012 | Mancosh | C04B 26/125 524/427 |
| 2012/0137937 | A1 * | 6/2012 | Dummett | B29C 48/53 108/57.17 |
| 2013/0033956 | A1 * | 2/2013 | Kirchhoff | B29C 48/285 366/83 |
| 2013/0107659 | A1 * | 5/2013 | Schulz | B29B 7/484 366/301 |
| 2013/0113134 | A1 * | 5/2013 | Derfuss | B29C 48/29 524/502 |
| 2013/0249139 | A1 * | 9/2013 | Morita | B29C 48/53 264/209.2 |
| 2013/0327858 | A1 * | 12/2013 | Rees | B02C 23/08 241/24.1 |
| 2014/0007783 | A1 * | 1/2014 | Scheeres | B29C 48/908 100/96 |
| 2015/0273753 | A1 * | 10/2015 | Barr | B29B 7/429 366/79 |
| 2015/0321419 | A1 * | 11/2015 | Linthicum | B29C 64/118 425/375 |
| 2017/0058094 | A1 * | 3/2017 | Frenkel | B29B 7/46 |
| 2019/0054662 | A1 * | 2/2019 | Ahmed | B29B 17/0042 |
| 2021/0402650 | A1 * | 12/2021 | Fayazbakhsh | B29B 7/726 |
| 2022/0177082 | A1 * | 6/2022 | Na | B29B 17/04 |

\* cited by examiner

DOUBLE SCREW CUTTER FOR RECYCLED CARBON FIBER MATERIAL AND METHOD OF CUTTING RECYCLED CARBON FIBER MATERIAL BY USING THE SAME

BACKGROUND OF THE INVENTION

Field of the Invention

The present invention relates to a double screw cutter for recycled carbon fiber material and a method of cutting recycled carbon fiber material by using the same, especially to a double screw cutter for recycled carbon fiber material and a method of cutting recycled carbon fiber material by using the same which are used to cut recycled carbon fiber with various lengths into a preset or required fiber length and thus make the following processes and applications of the recycled carbon fiber become more convenient.

DESCRIPTION OF RELATED ART

Carbon fibers are composed of carbon atoms with advantages of high tensile strength, elastic modulus, and high thermal resistance. The carbon fiber contains about 93-95% graphite. Carbon fiber is produced by carbonize precursors into all-carbon fiber filament by heat decomposition at high temperature. The precursors for carbon fibers include polyacrylonitrile (PAN), rayon, pitch, etc. To form a carbon fiber, the carbon atoms are bonded either in crystals and aligned parallel to the fiber's long axis. Thus, the carbon fiber has a high strength-to-volume ratio. Thousands of carbon fibers are brought together to form a fiber bundle, which can be used itself or woven into a fabric.

The carbon fiber features on high stiffness, high tensile strength, light weight, high chemical and thermal resistance, and low thermal expansion. The carbon fiber is lighter than aluminum and stronger than steel, having low density (one fourth of iron's density), and 10× stronger than iron. The carbon fiber can be weaved into fabric, felt, mat, tap, or other fabric patterns and usually used as reinforcing material to be modified with other materials including resin, metal, ceramic, concrete, etc. to form composite material. Thus, the carbon fiber is very popular in aerospace, civil engineering, military, motorsports, and other competition sports product.

The carbon fiber mentioned above has been used in products of a plurality of industries due to its excellent properties. Yet the carbon fiber is costly so that cost of the related products is quite high. For this reason, how to recycle carbon fiber waste effectively has become an important issue.

There is room for improvement and there is a need to provide a double screw cutter for recycled carbon fiber material and a method of cutting recycled carbon fiber material by using the same, which are more convenient to use.

SUMMARY OF THE INVENTION

Therefore, it is a primary object of the present invention to provide a double screw cutter for recycled carbon fiber material and a method of cutting recycled carbon fiber material by using the same, by which recycled carbon fiber with various fiber lengths is cut into a preset or required length and the following processes and applications of the recycled carbon fiber become more convenient. Thereby the cutter and the method according to the present invention are more convenient to use and more effective.

In order to achieve the above object, a double screw cutter for recycled carbon fiber material according to the present invention includes a housing and counter-rotating twin screws.

A cut channel is formed in the housing while a long-fiber feed inlet, a mid-fiber feed inlet, and a short-fiber feed inlet are disposed on an outer surface of the housing and all are communicated with the cut channel A discharge outlet is arranged at a rear end of the housing and aligned and communicated with the cut channel correspondingly. The counter-rotating twin screws are mounted in the cut channel of the housing and provided with two screw rods rotated in opposite directions simultaneously.

Preferably, a distance between the long-fiber feed inlet and the discharge outlet is 750 mm and a distance between the mid-fiber feed inlet and the discharge outlet is 500 mm while a distance between the short-fiber feed inlet and the discharge outlet is 78 mm Preferably, a length of each of the two screw rods of the counter-rotating twin screws is 950 mm.

Preferably, one end of each of the two screw rods of the counter-rotating twin screws corresponding to the discharge outlet of the housing is a first end with a diameter of 22 mm and a gap between the first ends of the two screw rods is 3 mm. An opposite end of each of the two screw rods is a second end having a diameter of 18 mm and a gap between the second ends of the two screw rods is 8 mm.

Preferably, two axial lines of the two screw rods of the counter-rotating twin screws are inclined toward each other from the first end to the second end. Each of the two screw rods is tapered from the first end to the second end.

In order to achieve the above object, a method of cutting recycled carbon fiber material by using a double screw cutter according to the present invention includes the following steps. Step A. dividing carbon fiber into long fiber with a length of 200 mm-300 mm, mid fiber with a length of 100 mm-200 mm, and short fiber with a length of 15 mm-100 mm; Step B. inputting the long fiber, the mid fiber, and the short fiber of the carbon fiber into a cut channel respectively through a long-fiber feed inlet located at a housing and communicated with the cut channel, a mid-fiber feed inlet located at the housing and communicated with the cut channel, and a short-fiber feed inlet located at the housing and communicated with the cut channel; Step C. driving two screw rods of a counter-rotating twin screws mounted in the cut channel to rotate in opposite directions at the same time and adjusting a rotation speed of the two screw rods according to a length of the carbon fiber users intend to recycle; and Step D. cutting the carbon fiber with different lengths input into the cut channel by the two screw rods rotating in opposite directions simultaneously and sending the carbon fiber toward a discharge outlet disposed on a rear end of the housing and communicated with the cut channel along with rotation of the two screw rods for outputting the carbon fiber cut into a preset length through the discharge outlet.

Preferably, a distance between the long-fiber feed inlet and the discharge outlet is 750 mm and a distance between the mid-fiber feed inlet and the discharge outlet is 500 mm while a distance between the short-fiber feed inlet and the discharge outlet is 78 mm Preferably, a length of each of the two screw rods of the counter-rotating twin screws is 950 mm.

Preferably, one end of each of the two screw rods of the counter-rotating twin screws corresponding to the discharge outlet of the housing is the first end with a diameter of 22 mm and a gap between the first ends of the two screw rods is 3 mm. An opposite end of each of the two screw rods is a second end having a diameter of 18 mm and a gap between the second ends of the two screw rods is 8 mm Preferably, two axial lines of the two screw rods of the counter-rotating twin screws are inclined toward each other from the first end to the second end. Each of the two screw rods is tapered from the first end to the second end.

Preferably, a length of the carbon fiber recycled is 15 mm-20 mm when the rotation speed of the two screw rods of the counter-rotating twin screws is controlled to be 150 rpm.

Preferably, a length of the carbon fiber recycled is 5 mm-10 mm when the rotation speed of the two screw rods of the counter-rotating twin screws is controlled to be 300 rpm.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content, purposes and functions of the present invention more clearly and completely, please refer to the following detailed descriptions with the figures and reference signs.

Figure 1:
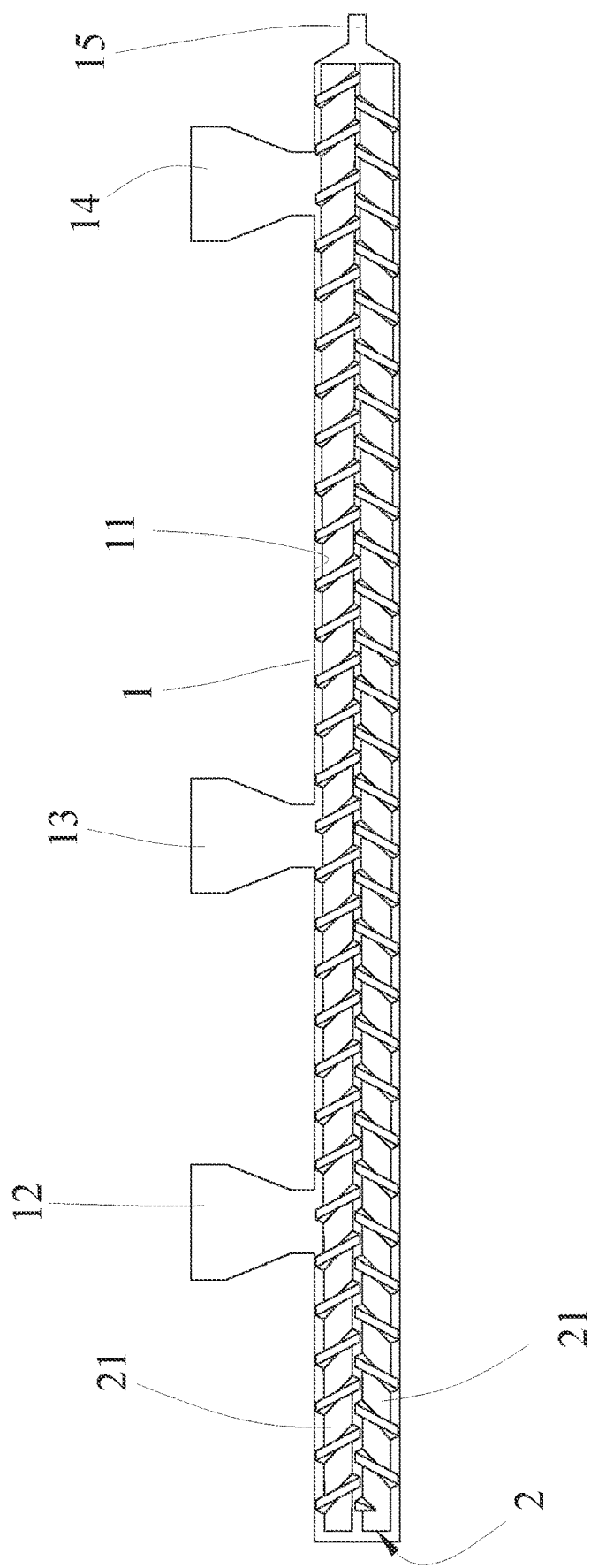
FIG. 1 is a schematic drawing showing structure of an embodiment according to the present invention.
Figure 2:
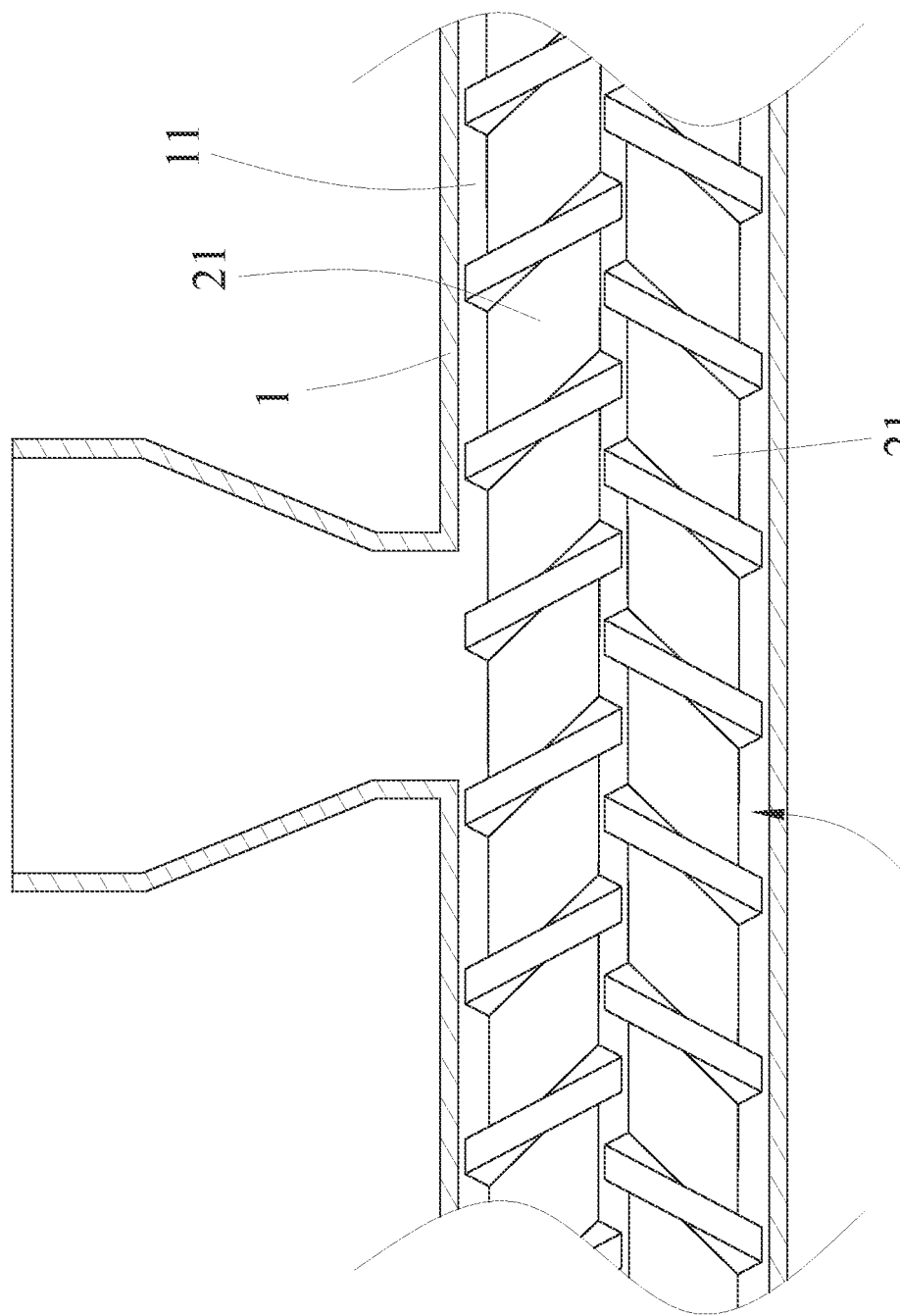
FIG. 2 is a partial enlarged view of an embodiment according to the present invention.

Refer to FIG. 1 and FIG. 2, a double screw cutter for recycled carbon fiber material according to the present invention includes a housing 1 and counter-rotating twin screws 2.

The housing 1 consists of a cut channel 11 formed therein, a long-fiber feed inlet 12, a mid-fiber feed inlet 13, a short-fiber feed inlet 14, and a discharge outlet 15. The long-fiber feed inlet 12, the mid-fiber feed inlet 13, and the short-fiber feed inlet 14 are disposed on an outer surface of the housing 1 and all are communicated with the cut channel 11. The discharge outlet 15 is disposed on a rear end of the housing 1 and aligned and communicated with the cut channel 11. A distance between the long-fiber feed inlet 12 and the discharge outlet 15, a distance between the mid-fiber feed inlet 13 and the discharge outlet 15, and a distance between the short-fiber feed inlet 14 and the discharge outlet 15 are respectively 750 mm, 500 mm, and 78 mm.

The counter-rotating twin screws 2 are mounted in the cut channel 11 of the housing 1 and provided with two screw rods 21 rotated in opposite directions simultaneously. A length of each of the two screw rods 21 is 950 mm One end of each of the two screw rods 21 corresponding to the discharge outlet 15 is a first end with a diameter of 22 mm and a gap between the first ends of the two screw rods 21 is 3 mm. The other end of each of the two screw rods 21 opposite to the first end is a second end having a diameter of 18 mm and a gap between the second ends of the two screw rods 21 is 8 mm Two axial lines of the two screw rods 21 are inclined toward each other from the first end to the second end. Each of the two screw rods 21 is tapered from the first end to the second end.

While in use, the recycled carbon fiber is divided into long fiber with a length of 200 mm-300 mm, mid fiber with a length of 100 mm-200 mm, and short fiber with a length of 15 mm-100 mm which are respectively input into the cut channel 11 through the long-fiber feed inlet 12, the mid-fiber feed inlet 13, and the short-fiber feed inlet 14 of the housing 1 correspondingly. Then the two screw rods 21 of the counter-rotating twin screws 2 are driven to rotate in opposite directions and a rotation speed of the two screw rods 21 is adjusted according to the length of the carbon fiber users intend to recycle. The rotation speed of the two screw rods 21 is controlled to be 150 rpm if the length of the carbon fiber the user intends to recycle is 15 mm-20 mm. When the user intends to recycle the carbon fiber with the length of 5 mm-10 mm, the rotation speed of the two screw rods 21 is shifted to 300 rpm. Thereby the carbon fiber with different lengths input into the cut channel 11 is cut by the two screw rods 21 rotating in opposite directions simultaneously and the cut carbon fiber is sent toward the discharge outlet 15 along with rotation of the two screw rods 21. Thereby the carbon fiber cut into a preset length is output through the discharge outlet 15.

In summary, the cutter and the method of cutting by using the same of the present invention can cut recycled carbon fiber with various fiber lengths into a preset or required length and thus make the following processes and applications of the recycled carbon fiber become more convenient. Thereby the cutter and the method according to the present invention are more convenient to use and more effective.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A method of cutting recycled carbon fiber material by using a double screw cutter, comprising the steps of:
   establishing a double screw cutter comprising a housing defining a cut channel extending within and along said housing, counter-rotating twin screws disposed in said cut channel within said housing, said counter-rotating twin screws being configured with two screw rods, each screw rod having a first end and a second end disposed opposite to said first end, wherein two axial lines of said two screw rods of the counter-rotating twin screws are inclined toward each other in a direction from said first end to said second end of each of the two screw rods, wherein said first end corresponds to a discharge outlet formed in said housing, and wherein each of the two screw rods is tapered in the direction from the first end to the second end;
   dividing carbon fiber into long fiber with a length of 200 mm-300 mm, mid fiber with a length of 100 mm-200 mm, and short fiber with a length of 15 mm-100 mm;
   feeding the long fiber, the mid fiber, and the short fiber of the carbon fiber into said cut channel respectively through a long-fiber feed inlet located at a housing in a communication with the cut channel, a mid-fiber feed inlet located at the housing in communication with the cut channel, and a short-fiber feed inlet located at the housing in communication with the cut channel;
   driving said two screw rods of said counter-rotating twin screws to rotate in opposite directions simultaneously and adjusting a rotation speed of the two screw rods according to a length of the carbon fiber to be recycled; and cutting the long fiber, the mid fiber, and the short fiber of the carbon fiber input into the cut channel by the two screw rods rotating in opposite directions simultaneously, and sending the carbon fiber toward a discharge outlet disposed on a rear end of the housing in communication with the cut channel along with rotation of the two screw rods for outputting the carbon fiber cut into a preset length through the discharge outlet.

2. The method as claimed in claim 1, wherein a distance between the long-fiber feed inlet and the discharge outlet is 750 mm and a distance between the mid-fiber feed inlet and the discharge outlet is 500 mm while a distance between the short-fiber feed inlet and the discharge outlet is 78 mm.

3. The method as claimed in claim 1, wherein a length of each of the two screw rods of the counter-rotating twin screws is 950 mm.

4. The method as claimed in claim 1, wherein the first end of each of the two screw rods of the counter-rotating twin screws corresponding to the discharge outlet of the housing has a diameter of 22 mm, and a gap between the first ends of the two screw rods is 3 mm, and wherein the second end of each of the two screw rods has a diameter of 18 mm, and a gap between the second ends of the two screw rods is 8 mm.

5. The method as claimed in claim 3, wherein the two axial lines of the two screw rods of the counter-rotating twin screws are inclined toward each other from the first end to the second end of the two screw rods, wherein the first end corresponds to the discharge outlet of the housing and the second end is opposite to the first end, and wherein each of the two screw rods is tapered from the first end to the second end.

6. The method as claimed in claim 1, wherein a length of the carbon fiber recycled is 15 mm-20 mm when the rotation speed of the two screw rods of the counter-rotating twin screws is controlled to be 150 rpm.

7. The method as claimed in claim 1, wherein a length of the carbon fiber recycled is 5 mm-10 mm when the rotation speed of the two screw rods of the counter-rotating twin screws is controlled to be 300 rpm.

* * * * *